United States Patent Office 3,279,984
Patented Oct. 18, 1966

3,279,984
METHODS AND COMPOSITIONS COMPRISING 1-BROMO-3-NITROBENZENE FOR CONTROLLING MARINE ORGANISMS
Donnell A. Ballard and James R. Rice, Lake Jackson, Tex., assignors to The Dow Chemical Company, Midland, Mich., a corporation of Delaware
No Drawing. Filed May 8, 1963, Ser. No. 278,975
18 Claims. (Cl. 167—38.6)

This invention is concerned with methods and compositions for the control of marine organisms.

It is an object of the present invention to provide a novel method of controlling marine organisms. It is another object of the present invention to provide a novel method for the control of marine organisms of the order Isopoda. It is also an object of the present invention to provide a novel method for the control of Limnoria. A further object of the present invention is to provide a novel method for treating wood. A still further object is the provision of an improved method for the preservation of, and prevention of deterioration of, wood exposed to the attack of marine organisms. Also, it is an object to provide novel compositions adapted to be employed for the practice of the methods to be employed for the practice of the methods of the present invention. Other objects will become apparent from the following specification and claims.

Limnoria, commonly called the "gribble," is a marine animal of the order Isopoda, and class Crustacea. While sometimes informally called a "worm" or "shipworm" or by some other name, it is in no true sense a worm. The mismononomer may arise from the fact that its damage to wood sometimes resembles that caused in wood in aerial or terrestrial exposure by the xylophagous larvae of various insects, which larvae are informally called "worms." The gribble is more nearly related to the crab or lobster than to the worms. It attains an adult size of up to about ¼ ich and has a segmented body with seven pairs of legs and charp, hooked claws. Respiration is carried on through platelike appendages (gills) the movement of which serves also to propel the animal in a swimming type of movement. The animal has among its mouth parts strong toothed mandibles. It occurs extensively at and just below tidal low water and is active along the entire Atlantic, Pacific, and Gulf coasts of the United States, as well as elsewhere throughout the world. Hence, in the present specification and claims the expression "marine" is used to identify the open sea as well as partially enclosed bays and river mouths and the like wherein salinity of water varies from that of the high seas to merely distinctly brackish.

Because its ability to swim is limited, the animal utilizes its claws to attach itself to wood, and its mandibles to chew the wood to which it attaches, burrowing in to a depth of an inch or more. Frequently enormous numbers of Limnoria attack wood, as, for example, up to 100 organisms per square inch, causing a characteristic broken-up appearance of the surface of the wood. Wood surfaces which have been attacked by such large numbers are greatly weakened and may be removed by the mechanical action of water movement, particularly that of waves, thus exposing to renewed attack a new surface of the wood, lessening the bulk of the wood structure, and increasing the possibility of attack by other marine organisms.

The new method for controlling marine organisms comprises contacting an organism of the genus Limnoria with a limnoricidal amount, that is, a Limnoria-controlling amount, of the 1-bromo-3-nitrobenzene compound having the formula

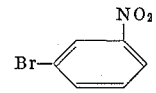

This compound is a solid material of very low solubility in water and of low to moderate solubility in various organic solvents. For the sake of convenience, the 1-bromo-3-nitrobenzene is referred to throughout the present specification as "nitrobenzene." The terms "controlling" and "control," as employed throughout the present specifications and claims, are utilized to describe the killing of, the inhibiting of, or the preventing of attack by, biological organisms. These terms are never used herein to mean attracting, encouraging or otherwise favoring the growth of biological organisms.

The 1-bromo-3-nitrobenzene can be employed in admixture with its isomers or other closely related products with no detriment to its efficiency in the present invention. Such procedure may be preferred in order to eliminate purification processes, especially when the nitrobenzene is produced on a commercial scale.

Preferably, the 1-bromo-3-nitrobenzene is employed in a modified form as a composition comprising the nitrobenzene and one or more limnoricidal adjuvants. Such adjuvant can be, for example, a surface-active dispersing agent, an inert finely-divided solid, a penetrating carrier vehicle, or a water-resistant binding material.

There are various manners in which contacting of Limnoria with nitrobenzene can be accomplished. The contacting can be effected by treating with nitrobenzene the aques media that constitute the habitat of Limnoria. For example, nitrobenzene can be dispersed in the media, conveniently with the aid of a surface-active dispersing agent. Also, nitrobenzene, conveniently in admixture with a penetrating solvent carrier, can be applied to wood for use in the habitat of Limnoria.

Such application to wood, which is preferably made before marine exposure thereof, can be as a paint, dip, spray, bath, or the like, according to procedures known to those skilled in the art. However, when it is desired to obtain more long lasting control of marine organisms, it is preferred to make application under pressure, frequently described as "impregnation," of a composition containing the nitrobenzene and a penetrating carrier vehicle, such as, for example, creosote, coal-tar creosote, oil-tar creosote, coal-tar creosote-coal-tar mixtures, petroleum oil, creosote-petroleum solutions, or various organic solvens, such as benzene, toluene, dioxane, acetone, and the like.

While the present nitrobenzene compound is of very low solubility in water, and usually presents no serious problem of leaching, the composition can also comprise any of various water-resistant binding materials, which, when the composition has been applied to the wood, will tend to bind the present limnoricidal compound to the wood and to prevent leaching of nitrobenzene into the liquid media in which the wood is placed. Suitable water-resistant binding materials are those materials which are gummy, near-solid or solid at room temperature and which are essentially insoluble in water and soluble in at least one organic solvent and include common paraffin waxes, which can be dissolved in hydrocarbon solvents; epoxy resins, which can be dissolved in oxygenated solvents such as lower alkyl ketones and dioxane; phenolformaldehyde type resins which can be dissolved in various ketones and alcohols; melamine resins of which representatives are similarly soluble; and the so-called "unsaturated polyester" liquids for room temperature cure of which a representative sample is a solution in styrene of a medium molecular weight terpolymer of maleic anhydride, phthalic acid and propylene glycol, together with such promoters as cobalt soaps, or dimethylaniline, and a peroxide type catalyst. Various other binding materials include the drying oils, numerous solvent soluble resinuous thermoplastic substances, and the like.

The nitrobenzene composition can comprise without, in addition to, or as, penetrating carrier vehicle and/or water-resistant binding vehicle, one or more other marine pest-controlling agents such as a wood preservative which controls, for example, fungal growth, insect attack, or attack of marine organisms other than Limnoria, such as Teredo, or an anti-fouling agent which controls, for example, barnacles and the like. Suitable wood preservatives are by-product oils, such as coal-tar creosote, coal-tar, petroleum oils, wood-tar creosote, oil-tar creosote, mixtures thereof, and the like; and chemicals such as pentachlorophenol, tetrachlorophenol, copper pentachlorophenate, zinc pentachlorophenate, copper naphthenate, zinc naphthenate, phenyl mercury oleate, and the like. Certain of the wood preservatives to be employed, notably the by-product oils, serve as adjuvant, as penetrating carrier vehicle and/or binding material and because of the combination of properties, their use is preferred. A particularly adjuvant is creosote.

In general, when employing the impregnation procedures, the wood which is to be treated with nitrobenzene in solution, or, optionally together with other substances as indicated above, is placed in a vessel from which the contained atmosphere is evacuated to achieve a subatmospheric pressure, such as from about 5 to about 600 millimeters mercury. Thereafter a mixture comprising nitrobenzene and a pentrating carrier vehicle is introduced into the vessel so as to effect the immersion of the wood therein. Preferably this mixture is at an elevated temperature, for example, from 180° to 200° F. The contents of the vessel can thereafter be placed successively under superatmospheric pressure, such as from about 1.5 to about 100 atmospheres, in some instances more, and under subatmospheric pressure, as previously set forth, for periods of time to facilitate the impregnation of the nitrobenzene solution into the wood. Techniques for facilitating penetration of the solution into the wood, such as incision, debarking, or other preparation of the wood, can be utilized.

The present nitrobenzene is effective in preventing Limnoria attack when employed in paints. These can be paints that, after application, become a firm and hard substance, such as paints based upon alkyd resins, or upon such drying oils as linseed. tung-nut, and like oils. Also, the nitrobenzene successfully controls Limnoria attack when incorporated into anti-fouling paints of the types that never become hard but are intended to remain viscous, yielding, and deformable. The nitrobenzene functions effectively in the presence or absence of, for example, metal flakes, pigments, volatile oils and the like.

Also, the nitrobenzene or composition of which the nitrobenzene is an active component can be applied to wood after which the wood can be painted or otherwise treated. While the nitrobenzene itself presents no unusual problem, it is noted that, to make possible painting after treatment with nitrobenzene, solvent, if any, should either be so volatile as to disappear, or be compatible with the paint.

The actual weight of nitrobenzene to be employed can vary considerably according to the circumstances in which it is employed. When it is desired to control Limnoria by dispersing nitrobenzene in sea water in which Limnoria infestation is usually a problem, good results are obtained when employing from about .01 to about 25 parts nitrobenzene per million parts sea water. Lower concentrations can be employed under such favorable conditions as still water, and relatively high levels of light and temperature. When desired, as under unfavorable conditions, higher concentrations can be employed. Where nitrobenzene is to be applied to wood, good results are obtained when employing the nitrobenzene to provide from about 0.001 to about 10.0, and preferably from about 0.1 to about 2.0, parts nitrobenzene per hundred parts by weight of wood tissue actually impregnated thereby. When only light protection is desired, surface coating or impregnation of an outer zone of wood suffices. This can be accomplished by painting or brief dipping with a nitrobenzene composition. When heavy protection is desired, deeper impregnation, which may be total impregnation, can be used.

When compositions are employed comprising the nitrobenzene and one or more additives such as pest-controlling agents, and, if desired, one or more adjuvants, the amount of nitrobenzene present will depend upon such factors as whether the composition is to be employed as a concentrate composition or as an ultimate treating composition, whether the composition comprises one or a plurality of additives, and the particular identity of the additive or additives employed. In a composition of which the essential components are nitrobenzene and a wood preservative, the nitrobenzene can be present in an amount of from about 0.5 to about 99.5 percent and the wood preservative can be present in an amount of from about 0.5 to about 99.5 percent, the percentages being based on the weight of ultimate composition. In a composition of which the essential components are nitrobenzene and a water-resistant binding material, the nitrobenzene can be present in an amount of from about 0.5 to about 99.5 per cent and the binding material can be present in an amount of from about 0.5 to about 99.5 percent, the percentages being based on the weight of ultimate composition. In a composititon of which the essential components are nitrobenzene, a wood preservative, and water-resistant binding material, the nitrobenzene can be present in an amount of from about 1.0 to about 80.0 percent, the wood preservative in an amount of from about 2.0 to about 96.0 percent, and the binding material in an amount of from about 1.0 to about 80.0 percent, all percentages being based on the weight of ultimate composition. As hereinbefore particularly set forth, the total percentage of all components of any given composition is 100 percent.

The following example illustrates the invention but it not to be construed as limiting.

*Example*

1-bromo-3-nitrobenzene is dispersed in creosote to form a composition containing 4.6 percent nitrobenzene by weight of resulting composition. The composition thus prepared is employed for the treatment of wood to control marine boring organisms.

Specimens of Southern yellow pine sapwood of uniform dimension are prepared. Certain of the specimens are treated with creosote only, hereinafter called Group B specimens; others are treated with the nitrobenzene composition, as prepared above, hereinafter identified as Group A specimens; and others are left untreated to serve as control specimens (Group C).

In the treating operations, the wood specimens to be treated are placed one group at a time in a vessel, from which air is evacuated until a subatmospheric pressure of about 10 millimeters absolute is obtained within the vessel. Simultaneously, the treating composition is heated to a temperature of about 180° to 200° F., whereupon the heated treating composition is introduced into the vessel under subatmospheric pressure, thereby restoring to normal atmospheric pressure the interior of the vessel. The wood specimens are permitted to remain for a period of time fully immersed in the treating solution; thereafter the specimens are removed. In this manner, specimens of Groups A and B are treated; Group C specimens are left untreated.

Specimens of all groups are thereafter exposed to Limnoria attack. Specifically, they are affixed to the earth near the normal low tide line of the sea in a region where Limnoria are prevalent and where exposed untreated wood structures usually suffer prompt and severe damage. The specimens are periodically inspected in situ. Examination of the specimens after one year of exposure shows that specimens of Group A are free from attack by any marine borers. Specimens of Group B show heavy attacks of Limnoria only, while specimens of Group C exhibit heavy attack by both Teredo and Limnoria boring organisms. Specimens of both Groups B and C are judged, after the said year's exposure, to be structurally worthless. Those of Group A are judged to be structurally sound.

What is claimed is:

1. A method which comprises contacting an organism of the genus Limnoria with a Limnoria-controlling amount of 1-bromo-3-nitrobenzene.

2. A method which comprises applying to wood 1-bromo-3-nitrobenzene in an amount sufficient to make the wood resistant to attack by an organism of the genus Limnoria.

3. The composition comprising 1-bromo-3-nitrobenzene and a wood preservative.

4. The composition of claim 3 wherein the wood preservative is creosote.

5. The composition of claim 3 wherein the wood preservative is coal-tar.

6. The composition of claim 3 wherein the wood preservative is pentachlorophenol.

7. The composition of claim 3 wherein the wood preservative is copper naphthenate.

8. The composition of claim 3 wherein the wood preservative is zinc naphthenate.

9. The composition comprising a wood preservative, a water-resistant binding material and 1-bromo-3-nitrobenzene.

10. The composition of claim 9 in which the wood preservative is creosote.

11. The composition of claim 9 in which the wood preservative is coal-tar.

12. The composition of claim 9 in which the wood preservative is pentachlorophenol.

13. The composition of claim 9 in which the wood preservative is copper naphthenate.

14. The composition of claim 9 in which the wood preservative is zinc naphthenate.

15. The composition comprising 1-bromo-3-nitrobenzene and a paint.

16. The composition of claim 15 wherein the paint is an anti-fouling non-drying paint.

17. The article resistant to attack by marine organisms which comprises wood impregnated with a by-product oil wood preservative to the extent of from about 5.0 to about 25.0 percent of the weight of the wood and impregnated with a Limnoria-controlling amount of 1-bromo-3-nitrobenzene.

18. The article of claim 17 wherein the by-product oil wood preservative is creosote.

References Cited by the Examiner

UNITED STATES PATENTS

| | | | |
|---|---|---|---|
| 1,881,617 | 10/1932 | Iwanowski et al. | 167—38.7 |
| 1,958,418 | 5/1934 | Calcott et al. | 106—15 |
| 2,750,323 | 6/1956 | Schmitz-Hillebrecht, et al. | 167—38.7 |
| 2,784,139 | 3/1957 | Cutler | 167—38.7 |
| 3,049,471 | 8/1962 | Behr | 167—38.7 |

OTHER REFERENCES

American Wood-Preservers' Association, paper by Hatfield, 11 pages, January 1931.

King: "Chemicals Evaluated as Insecticides," U.S. Dept. of Agriculture, Agriculture Handbook No. 69, May 1954, page 63.

JULIAN S. LEVITT, *Primary Examiner.*

G. A. MENTIS, *Assistant Examiner.*